May 6, 1924.

P. J. TIMBERLAKE

AIR VALVE

Filed July 26, 1922

1,493,293

Inventor,
Paul J. Timberlake.

By John S. Barker
his Attorney

Patented May 6, 1924.

1,493,293

UNITED STATES PATENT OFFICE.

PAUL J. TIMBERLAKE, OF JACKSON, MICHIGAN.

AIR VALVE.

Application filed July 26, 1922. Serial No. 577,628.

*To all whom it may concern:*

Be it known that I, PAUL J. TIMBERLAKE, a citizen of the United States, residing at Jackson, in the county of Jackson and State of Michigan, have invented certain new and useful Improvements in Air Valves, of which the following is a specification.

My invention relates to air valves, and particularly to valves intended to be applied to inflatable articles, such as life preservers, swimming appliances, and toys, and so constructed that the articles to which they are applied may be inflated from the lungs, the user applying his lips to an exposed part of the valve itself. However, the invention is not limited to uses such as have been indicated, being adapted, as will be apparent, to use in a wide variety of conditions.

In the accompanying drawings—

Figure 1:
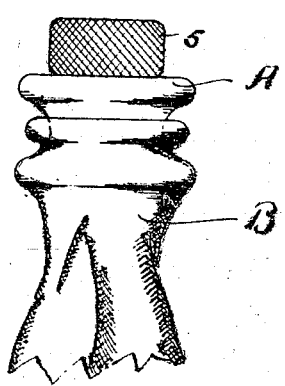
Figure 1 is an elevation illustrating the manner of applying the valve to an article to be inflated.

In Fig. 1 of the drawings A designates the valve, considered as a whole and B the inflatable object to which the valve is applied. This object is typical of inflatable toys, air containers for life preservers, and the like.

Figure 2:
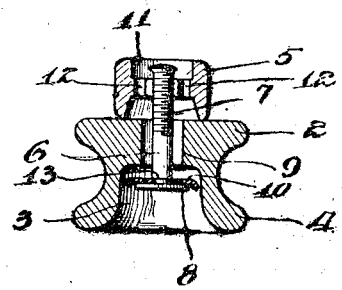
Fig. 2 is a central longitudinal sectional view of one form of the valve.

Referring particularly to Fig. 2, 2 represents the main body or cage of the valve. It is formed with a skirt 4 surrounding an interior chamber 3. The skirt 4 is exteriorly shaped to receive and retain in air tight engagement therewith the neck of an article such as represented by B in Fig. 1.

The body of the valve is perforated, preferably centrally as indicated at 9, to permit the free passage of a stem 6, screw-threaded as at 7 to receive a nut 5. The stem carries at its inner end a head or plate 8 adapted to lie within the chamber 3 of the valve cage 2. 10 indicates a washer of elastic material resting upon the head 8 of the valve stem and arranged to be held thereby in engagement with the inner wall of the valve cage 2 and covering the opening or openings 9, which it is adapted to close air tight.

In the outer portion of the nut 5 there is formed a chamber 11 surrounding the stem 6. The wall of this chamber may be screw-threaded to receive the coupling of an air pump. 12, 12 designate longitudinal perforations extending through the nut 5 and opening at their outer ends into the chamber 11. The inner end or face of the nut is adapted to bear against the outer face of the valve cage 2.

The operation of a valve such as described is as follows: The neck of the object A to be inflated is drawn over the skirt 4 of the valve, and caused to make an air-tight connection between the valve and the article to be inflated. The nut 5 of the valve is then rotated to loosen the stem 6 permitting the head 8 thereof to be forced into the chamber 3 and away from the opening 9 through the valve cage. The washer 10 should follow the head 8 leaving the opening uncovered and unobstructed. To insure this movement of the valve when the stem is moved inwardly the latter is formed with a circumferential groove 13, immediately back of the head 8, in which lies the inner edge of the washer 10. The central opening through the washer is of a size to cause the washer to closely fit the part of the valve stem which is reduced in size by the formation of the groove 13. The washer is thus held in close engagement with the head 8 and is caused to partake of the longitudinal movements of the stem 6, thus making it impossible for it to stick against the inner face of the valve cage and so fail to uncover the opening 9 when the nut is turned to permit the valve stem to move inwardly.

The valve being thus opened the article B is inflated, either by a pump connected with the nut 5 or directly, by the person using the valve applying his lips to the nut and blowing through the valve device. When the article has been inflated to the desired extent the operator removes his lips from the nut, or disconnects the pump coupling. The valve stem 6 being now free air pressure against the inner surfaces of the head 8 and washer 10 will force these parts against the inner wall of the valve cage, sealing the opening 9 and preventing the escape of air. In order to hold the washer tightly seated the nut 5 is turned until the head 8 is drawn close to the inner surface of the valve body, and tightly clamp the washer between the head 8 and the said inner wall, thus forcibly sealing the opening or openings 9. To deflate the object B it is only necessary to turn the nut to loosen the stem 6 and then press the latter inward until the valve washer 10 is unseated.

Figure 3:
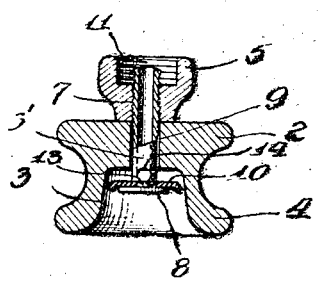
Figs. 3 and 4 are central sectional views illustrating other forms of the invention.

In the form of invention illustrated in Fig. 3 the valve stem 6' is hollow, and the nut 5 does not have through it openings corresponding with those designated 12 in Fig. 2. In lieu of these the stem is hollow longitudinally and is transversely perforated at 14 above or inside of the washer 10, to permit air to pass from the outside through the stem and into the chamber 3 of the valve cage or body 2, whenever the washer is unseated or the valve open.

The shapes of the several parts of the valve represented in Fig. 3 are different from those of the valve shown in Fig. 2, but since they are functionally the same, corresponding parts are designated by the same reference characters in both views. The operation of the valve shown in Fig. 3 is like that which has been described in connection with the valve shown in Fig. 2.

The outer end of the stem 6, whether solid as represented in Fig. 2 or tubular as represented in Fig. 3, may be expanded after the nut has been applied thereto in order to prevent the nut from being easily screwed off and separated from the stem, thus reducing danger of the nut being lost to a minimum.

Figure 4:
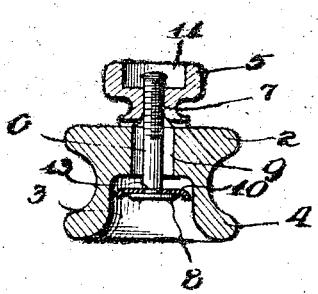

In Fig. 4 I have illustrated a form of the invention similar to that represented in Fig. 2 except that the air channels 15 through the nut 5 are formed in the inner or bottom face thereof so that they communicate with the chamber enclosed by the skirt of the valve body, through the opening or air passage 9.

In using either form of the invention the inner end of the nut will engage with the outer surface of the cage or body 2 of the valve, not only when the nut is being turned upon the screw-threaded stem to draw the valve washer to its seat, but also during the time that the article to which the valve is applied is being inflated, especially when such inflation is by air blown from the lungs of the person using the valve who applies his lips to the nut 5. In order that the valve device may be used as just suggested the nut must be constructed to permit the passage of air through it during the operation of inflation when the inner end of the nut will be held in rather close engagement with the outer face of the valve body. In Fig. 2 this passage of the air through the nut is permitted by providing the nut with longitudinal perforations 12; while in the form of valve shown in Fig. 3 the air passes through the hollow stem 6' on which the nut is mounted, and in this way passes through the nut which need not be otherwise longitudinally perforated than to provide a seat for the screw-threaded stem 6'.

What I claim is:

1. An inflating valve over which the lips of a person may close, comprising a body portion to which the article to be inflated may be secured which is perforated to permit the person to blow through it, a self-seating washer for closing on the inner side the perforations in the valve body by pressure of the air confined in the inflatable article, and an adjustable nut and screw for holding the closing washer securely seated.

2. An inflating valve comprising a cage or body to which the article to be inflated may be secured said cage being perforated to permit the passage of air, a washer for closing on the inner side the perforations in the cage or body, a nut and screw for holding the closing washer securely seated, the nut having engagement with the valve cage or body and permitting the passage of air through it when the valve or washer is unseated.

3. An inflating valve having a body or cage with an air passage through it, a valve to close such passage, a screw and nut to hold the valve seated and thus close the air passage, there being an air passage through the nut communicating with the interior of the valve cage when the valve is unseated, but cut off by the seating of the valve.

4. An inflating valve having a body or cage formed with a chamber surrounded by a skirt to which the article to be inflated may be attached, an air passage through the body or cage into the chamber, a valve washer located within the chamber for closing the air passage through the body or cage, a screw-threaded stem and a nut for holding the washer seated to close the air passage or to leave the washer free to uncover the air passage accordingly as the nut is adjusted, the nut bearing against the outside of the cage or body and constructed to permit air to pass through it into the chamber in the valve cage or body when the valve is unseated.

5. An inflating air valve comprising a body or cage with a chamber surrounded by a skirt to which the article to be inflated may be secured, an opening through the said body into the chamber through which air may pass, a washer within the chamber for closing the opening, a screw-threaded stem for seating the washer to close the air passage, and a nut engaging with the screw-threaded stem, the nut having an air passage through it, such passage communicating with the chamber in the valve body or cage above the washer and arranged to be cut off from the said chamber when the washer is seated.

6. An inflating air valve comprising a body with which the article to be inflated may be connected, enclosing an air chamber and having an end through which is an opening leading to said air chamber, a washer within the chamber closing against the inner face of the end of the body to seal the opening through it against the passage of air, a hollow screw-threaded stem carrying the washer and passing through the said opening in the end of the valve body, the stem being perforated transversely near the said washer, and a nut engaging with the stem and bearing against the outer face of the end of the valve body to hold the washer tightly against the inner face thereof with the perforation through the hollow stem within the opening through the end of the valve.

7. An air valve comprising a cage or body perforated to permit the passage of air through it, a washer for closing the air passage, a screw-threaded stem provided with a head against which the washer rests, the stem adjacent to the head being circumferentially grooved and the inner edge of the washer fitting closely the grooved part of the stem whereby the washer is moved toward and from its seat as the stem is moved longitudinally, and a nut for adjusting the stem to seat the washer.

PAUL J. TIMBERLAKE.